United States Patent Office 3,429,368
Patented Feb. 25, 1969

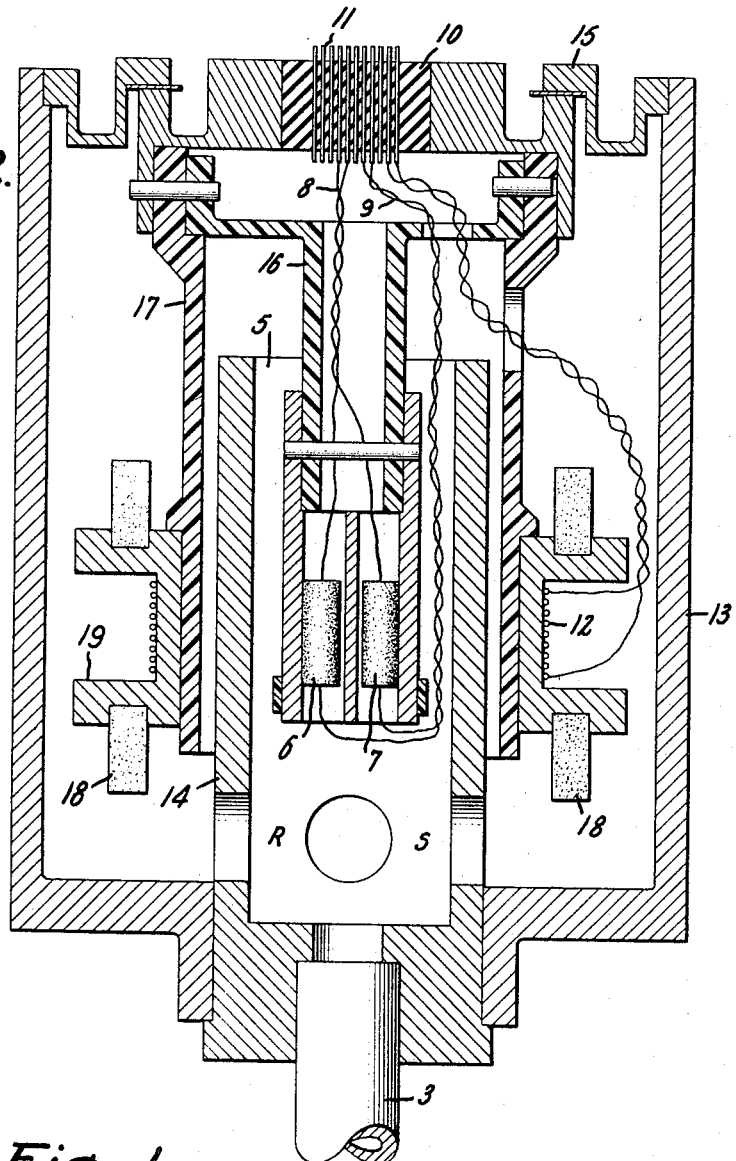
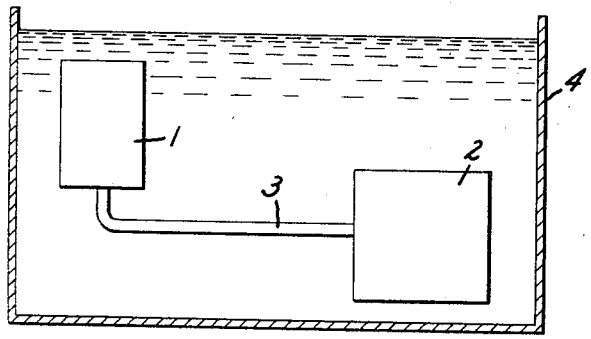

3,429,368
CRYOGENIC HEAT TRANSFER CONTROL SYSTEM
Theodor A. Buchhold, Schenectady, Loyd B. Nesbitt, Alplaus, and Karl F. Schoch, Scotia, N.Y., assignors to General Electric Company, a corporation of New York
Filed Dec. 30, 1966, Ser. No. 606,330
U.S. Cl. 165—30                                         8 Claims
Int. Cl. F25b 37/00, 29/00

ABSTRACT OF THE DISCLOSURE

The rate of heat transfer from a heat generating body to a cold body is controlled by varying the density of the gaseous medium through adsorption onto and evaporation from a material having a high surface area such as charcoal. Adsorption and evaporation of the gas is regulated by heating or allowing the adsorptive material to cool.

---

Our invention relates to a heat transfer control system and particularly to a heat transfer control system to operate at cryogenic temperatures.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

It is necessary to maintain temperature at a substantially constant level in many situations. Heretofore, no cryogenic control system has existed which would maintain temperatures or pressures substantially constant at temperatures near absolute zero. Further, the temperature may be somewhat subject to outside influences such as heat sources in the immediate neighborhood and fluctuations in the weather. Where a constant rate of heat transfer was present, heat sources in the immediate neighborhood would affect temperature within the device.

It is an object of our invention to provide a mechanism for controlling heat transfer from an object by pressure regulation, i.e., regulating the temperature of a heated object by regulating the rate heat is dissipated from it by gas conduction to a cooling medium.

Another object of this invention is a device for maintaining and controlling the pressure of a gas at low pressure.

In brief, our invention is a heat transfer control system for maintaining constant heat transfer by gas conduction from an otherwise thermally isolated body. This is done by having a variable amount of gas in a chamber so that the amount of heat transferred by conductance from an object in the chamber to the cooling element can be regulated by varying the amount of gas present thereby maintaining the object at a substantially constant temperature which may be near absolute zero. The amount of gas in the chamber is varied by controlling the temperature of a gas sorbing material in the chamber. This gas sorbing material will give off gas into the evacuated chamber at higher temperatures and sorb said gas into its surface at lower temperatures. By regulating the temperature of the sorbing material, the degree of vacuum in the evacuated chamber is controlled and thus the rate of heat transfer from the object to the cooling element will be controlled. The temperature of the sorbent material is regulated by a heating element. A temperature sensing element controls the amount of electric current to the heating element of the sorbing unit in accordance with the heat conduction rate through the gas and by controlling the heat of the sorbing unit controls the gas content of the chamber.

FIGURE 1 shows a schematic diagram of our invention.

FIGURE 2 shows the details of an embodiment of our invention.

Figure 3:
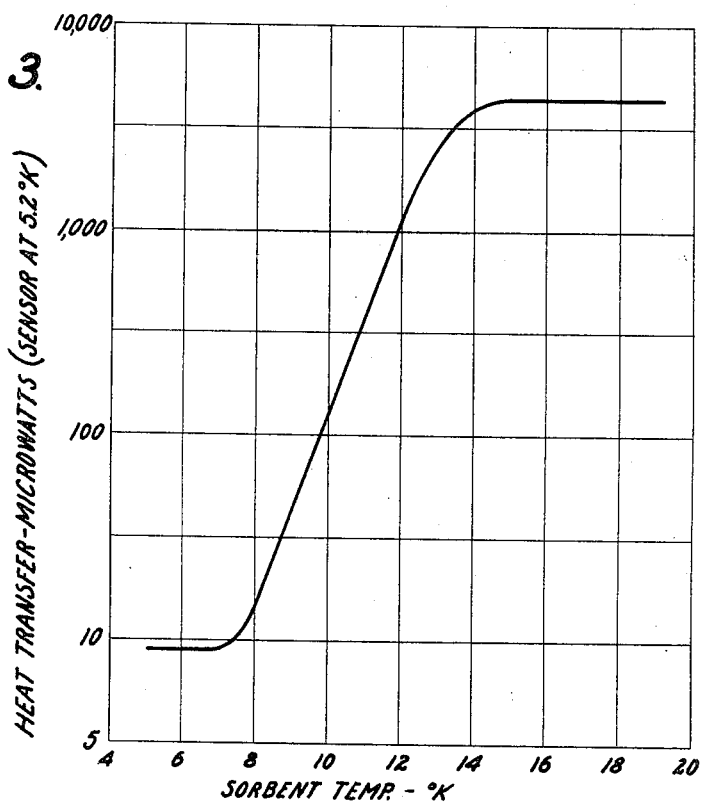
FIGURE 3 shows a graph of adsorbing material temperature and heat transfer.

FIGURE 1 shows a schematic embodiment of our invention where the temperature of a cryogenic gyroscope is to be maintained at a constant low level. The drawing shows the device to be in two sections or containers connected by a tube. In this embodiment the temperature sensing and control unit is located in container 1 while the gyroscope is in container 2. The containers are connected by a tube 3 and both of these containers and their connecting tube are immersed in a bath 4 filled with liquid such as liquid helium. Cryogenic gyroscopes employing superconducting motors and bearings require very low temperatures for proper operation and because of these low temperatures and related effects there is an enhanced constancy of drift behavior. The inconstancy of drift is a limiting factor in the accuracy of conventional gyroscopes but is not limiting in the cryogenic gyroscope. In cryogenic applications, the gyro unit is ordinarily run at a temperature on the order of 10° Kelvin. Temperature fluctuations will cause variations in the rotor suspension and drive systems and degrade performance. In order to control these variations, a sensor is needed which exhibits relatively large changes in resistance through the range of temperature encountered in usual operation, this sensor generating signals in a control circuit that varies the current through a heater to cause changes of temperature of a gas sorbing material and the ambient gas. The change of temperature of the gas sorbing material causes the material to discharge or sorb the proper amounts of gas to maintain a constant rate of heat transfer from the gyro to the cooling element. The gas sorbing material may be heated by an independent heater or may itself combine the quality of heater and sorbent surfaces. It is contemplated that the gas sorbing material can be a material having a large sorbent surface such as carbon or a zeolite. For very low temperature operation, a gas such as helium which liquifies at about 4° Kelvin or hydrogen which liquifies at about 20° K. can be used as the coolant.

The change in rate of heat transfer results from a change in gas density which in its turn is brought about by a change in the equilibrium between the amount of gas sorbed and the amount free to engage in heat transfer. The equilibrium amount of gas free for heat transfer purposes is a function of the temperature of the sorbent material. It is desirable to use a gas whose amount free to engage in heat transfer will change appreciably in the temperature range through which the apparatus will operate. In the case of the cryogenic gyroscope which must operate at a temperature in the order of 10° K., helium gas is used since other gases solidify at this temperature. However, the technique set forth in this disclosure can also be used at higher temperatures such as 20° K. or 77° K. using liquid hydrogen and liquid nitrogen for cooling. Hydrogen or nitrogen gas respectively, could then be used as the heat transfer agent. This control system controls both temperature and pressure in any low temperature-low pressure system.

By using the system shown diagrammatically in FIGURE 1, the temperature of the object in the evacuated chamber can be maintained at any desired cryogenic temperature at or above the bath temperature.

With use, the characteristics of the sorbent material may change somewhat. However, the overall effect of the change on the cooling system will affect only the amount of heat necessary to apply to the sorbent material and this will change somewhat with the changes of the gas sorbing characteristics of the material or with changes in surface accommodation coefficients which will cause variation in heat transfer. Thus, the constancy of the helium pressure maintained within the evacuated chamber will be varied from time to time to compensate for the possible variations within the chamber. The heater wire should be of a type that has the characteristics of high coefficient of resistivity at low temperatures, low temperature coefficient of expansion and low contact potential with good conductors. An example of such a wire is manganin wire. The sensing, heating and adsorbent material unit will be supported by a wall of the evacuated chamber and insulated from it by means of a material having a low coefficient of conductance such as nylon or Teflon.

FIGURE 2 shows a detailed embodiment of the control apparatus of our invention. Centrally located in FIGURE 2 is a cylinder 5 having a resistance heater 6 and temperature responsive sensor 7 mounted in it. As shown in this embodiment the heater and sensor units are separated and are individual elements. They may be made of any material whose resistance varies with temperature over the temperature range in which it is desired to operate, for example, carbon in the range 4°–20° K. The sensor and cylinder 5 are at a temperature slightly above the surrounding medium and must have the characteristic of a fairly rapid response with temperature over the operating range so that a small change of temperature causes (a change of resistance in) the sensor sufficient to give a (voltage) signal dependent upon temperature. This (voltage) is used to control a heating unit for the sorbed gas and cause its evaporation.

When cooling starts from room temperature, a higher rate of cooling is desirable initially to avoid a long cooldown time. Electric current passes through the heating units at a sufficient rate to cause the sorbed gas to be evaporated from the sorbent material and flow out in the containers where it conducts heat for cooling. When the temperature of internal parts has cooled near the desired level, the sorbent heater current will be reduced and the sensor will then control the current passing through the heating unit to allow the sorbent material to cool and cause heat transfer at a slower rate.

The heating unit must be such that a current will cause heat generation at very low temperatures. The sorbent material must be such that a change in temperature will result in a change in the equilibrium between the gas sorbed and the gas free to engage in heat transfer. While shown as two separate elements 6, 7, it is possible to combine the sensor and heater as one carbon element without too much loss of function. The combination of sensor and resistor mounted in one assembly operates to facilitate measurement of heat transfer rates from cylinder 5. Gas is led from the gyro housing to the sensing unit by a tube 3. Electric leads 8, 9 pass from outside the housing to the resistor and sensor carbon components through a multi-lead 10 in the housing. The multi-lead terminal has tabs 11 located exteriorly and interiorly of the housing and electrical connectors to the sensor and resistor carbon elements and electrical connectors to the manganin wire heating element 12 are run through this multi-lead terminal. The multi-lead terminal is hermetically mounted in some part of the housing and is sealed into the housing. Alternatively, a series of terminals may be mounted in the top of the housing. This fixture or fixtures are made of any of the usual insulating materials such as ceramic, porcelain or the like. The electric leads may be run through individual terminals rather than a multi-lead terminal but for convenience of assembly a multi-lead terminal is preferred. The outer shell 13 of the housing is made of a material having high thermal conductivity such as copper and in the general shape of a cup so as to allow maximum heat transfer throughout and thus to promote heat stability between the inside and the outside of the fixture or element of the housing.

Located about the heat transfer sensing unit is a tumbler shaped element 14 made of a material having high thermal conductance at low temperatures, for example, copper.

The tumbler shaped element 14 is not structurally attached to the sensor element but is brazed into a hole in the bottom of the outer copper housing 13. The brazing or welding connection provides a path of thermal conductivity from the outer copper housing to the bottom of said tumbler, and into the inside of said housing through the sides of the tumbler element and provides a hermetic seal between the element and housing. In this way the area surrounding the sensing element will be at very nearly the same temperature as the temperature of the cooling material surrounding the outer housing. Mounted on the cup-shaped outer shell is a cover 15 made of one or more circular elements. This element in hermetically sealed to the rim of the cup-shaped member and has the multi-lead terminal 10 mounted on it. The connecting tube 3 and gyro-compass housing 2 are immersed in a helium bath in this embodiment. Other cooling materials may be used for other higher temperature applications of this heat transfer control technique.

A supporting cylinder 16 of non-heat conductive material having good tensile strength, such as nylon, is suspended from the cover and a conductive cylinder 5 made of heat conductive material is fastened to the supporting cylinder. The heat sensor 6 and resistor 7 are located side by side in the cylinder and are in heat conductive relationship with each other and the conductive cylinder. Since the conductive cylinder rests inside of the tumbler but does not touch the tumbler it will approach the temperature of the tumbler at a rate depending upon the density of the ambient gas which conducts heat from the conductive cylinder 5 to the tumbler 14.

A shielding cylinder 17 of non-conducting material is attached to the underside of the cover and supports the heater 12 and the sorption elements 18. The heating and sorption elements are mounted on a ring member 19 which is U-shaped in cross section. Running about this ring member to form a coil is a wire 12 of low coefficient of expansion with heat and good resistance qualities, such as manganin wire. This wire is the basic heating element for the sorption material. The ring shaped member upon which the manganin wire is mounted is made of a good conductor such as copper so that the heat from the manganin wire will be rapidly passed to the sorbing material which is mounted in or adjacent to the copper ring shaped member 19. The sorbing material must be mounted in good heat transfer relation to the ring so that the heat coming from the manganin wire to the copper ring will be rapidly transferred to the absorbing material in order that the sorbing material will quickly liberate some of the gas sorbed onto the material in response to the temperature change. A material such as charcoal or a zeolite can provide a surface having the desired characteristics.

Thus, in overall operations, the heat sensor is located in the center of the chamber and is heated by the resistor 6 to be slightly hotter than its surroundings. Measurement of the amount of power to this heater 6 and the temperature of the sensor permits the determination of heat transfer conditions. The resistivity of sensor 7 is affected by heat so that a small change in temperature will give a sharp change in its resistivity which in turn will affect the voltage across this element since a constant current passes through the sensor. This voltage signal is then used in a bridge circuit (FIGURE 4) to regulate as will be discussed later, the amount of current passing through the manganin wire heating element 12. The quantity of heat passed from the central cylinder to the sides of the tumbler is proportional to the amount of gas in the space between the cylindrical plates, other things being equal. As sorbed gas is given off from the absorbent material, the rate of heat transfer in the system will increase and more rapid cooling will take place.

When internal parts have been cooled less electric current will be passed through the manganin wire heater 12 and more gas will be sorbed onto the sorbent material. Thus, the amount of heat and the temperature imparted to the sorbent pellets will determine the amount of sorption or evaporation of a gas such as helium from the pellets and in turn will affect the heat transfer to and from the object which is to be kept at a specified temperature or temperature range.

An advantage of our invention is that at very low temperatures the heat of the sorption material can be controlled to give slow or fast cool down.

FIGURE 3 shows a graph of sorbent temperature versus heat transfer at an initial helium gas pressure of 0.2 torr measured with the assembly at 300° K. Approximately 2 grams of type 5A molecular sieve material was used (available from Linde Division, Union Carbide Corporation). A variety of adsorbent materials such as charcoal have similar properties and are suitable for use in this connection.

Figure 4:
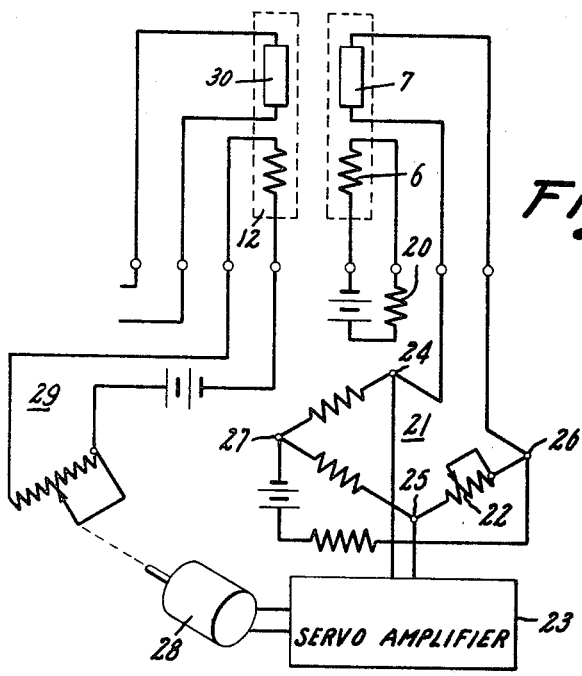
FIGURE 4 shows a diagram of an electrical system for controlling the device.

In FIGURE 4 we show a modified schematic diagram of the heat control circuit of our invention. In the embodiment shown here a constant amount of heat is supplied through the heater 6 in the heat transfer sensor. Constant current passes through the heater resistor element to a relatively large resistance 20 and back through the current source. In this way, the heat supplied to the conductive cylinder 5 is relatively constant since the current going through the heater 6 is maintained nearly constant. The temperature sensor 7 is part of a Wheatstone bridge balance circuit 21 having a variable resistance arm 22. A servo amplifier 23 is connected between points 24 and 25 of the Wheatstone bridge circuit and a relatively constant voltage is applied across the points 26 and 27 of the Wheatstone bridge. The servo amplifier controls servo 28 which regulates the amount of resistance in the heater circuit 29 and controls the current passing through the manganin wires 12 of the sorbent unit heater. The sorbent unit heater heats the sorbent material and thereby controls the amount of gas surrounding the heat transfer sensor and the sorbent unit. A temperature sensing element 30 may be mounted on the sorbent unit heater. By varying the value of resistor 22 the system may be set to operate on some particular part of the temperature-thermal transfer curve (FIGURE 3) which corresponds to the particular absorbent material and initial gas conditions used in the system. Ordinarily, the system is operated on the low portion of the temperature heat transfer curve (FIGURE 3) so that possible variations of the amount of heat to be transferred would not go beyond the limits of the system as shown by the curve.

Although no temperature sensor is shown on the sorbent unit of FIGURE 2, such a temperature sensor may be installed at some point of collar 19. The use of a temperature sensing means on the sorbent unit is optional and is not shown in FIGURE 1. However, as shown in FIGURE 4, such a temperature measuring device 30 may be used to determine the temperature at which the sorbent unit is run.

Other advantages are that our control system will modify to compensate change in coefficient of absorption of the adsorbing material, will work effectively at temperatures down to the liquifying point of helium and will maintain a variable vacuum to control the rate of heat transfer from the bath to the object the temperature of which is being regulated.

The foregoing is a description of an illustrative embodiment of our invention, and it is our intention in the appended claims to cover all forms which fall within the scope of the invention.

What we claim as new and desire to secure by Letters Patent of the United States is:

1. In combination,
   a conductive enclosure including a gas therein,
   an object mounted in said enclosure in heat exchange relationship with said enclosure through said gas,
   sorption means in said enclosure for sorbing and desorbing said gas in said enclosure in response to the temperature thereof, said sorption means sorbing gas as the temperature thereof falls,
   whereby the conductivity of the path of heat flow through said gas from said object to said enclosure is varied in accordance with the heat generated in said object.

2. The combination of claim 1 in which said enclosure is conductively connected to a heat sink.

3. The combination of claim 1 in which said enclosure is immersed in a liquid refrigerant.

4. The combination of claim 1 in which said sorption means is molecular sieve.

5. The combination of claim 1 including means for varying the heat input into said sorption means to vary in accordance therewith the density of said gas in said enclosure.

6. The combination of claim 5 including means responsive to a change in one direction in the temperature of said object to change the heat input to said sorption means in the same direction, whereby the conductivity of heat from said object to said enclosure through said gas is changed in accordance with the change in temperature of said object.

7. The combination of claim 6 in which said enclosure is a pair of chambers connected by a conduit and in which said object is housed in one of said chambers and said sorption means, heat input means and temperature responsive means are housed in the other of said chambers.

8. The combination of claim 6 in which said object is an electromechanical device.

References Cited

UNITED STATES PATENTS

| | | | |
|---|---|---|---|
| 2,923,759 | 2/1960 | Swan | 165—40 |
| 2,856,160 | 10/1958 | Kaye et al. | 165—32 |
| 3,273,634 | 9/1966 | Snelling | 165—1 |

ROBERT A. O'LEARY, *Primary Examineer.*

CHARLES SUKALO, *Assistant Examiner.*

U.S. Cl. X.R.

165—39, 47